United States Patent [19]

Holl et al.

[11] Patent Number: 4,582,428
[45] Date of Patent: Apr. 15, 1986

[54] NON-RETRO ANGLE OF ARRIVAL METER

[75] Inventors: Herbert B. Holl, Huntsville; Gene H. Widenhofer, Madison, both of Ala.

[73] Assignee: The United States of America as represented by the Secretary of the Army, Washington, D.C.

[21] Appl. No.: 575,639

[22] Filed: Jan. 30, 1984

[51] Int. Cl.$^4$ .................... G01B 11/26; G01C 21/06; G01C 1/00
[52] U.S. Cl. ................................. 356/152; 356/141
[58] Field of Search .............. 356/141, 152; 250/203 R, 216

[56] References Cited
U.S. PATENT DOCUMENTS 3,137,794  6/1964  Seward ................. 356/152
4,325,633  4/1982  Gardner ............... 356/152

Primary Examiner—S. C. Buczinski
Assistant Examiner—Melissa Koltak
Attorney, Agent, or Firm—Anthony T. Lane; Robert P. Gibson; James T. Deaton

[57] ABSTRACT

A non-retro angle of arrival meter in which reflection means are mounted relative to an aperture and to detectors for radiation such that radiation passing through the aperture is reflected from the reflection means to the detectors to cause signals to be produced at the detectors that can be processed by a processor for recording these signals and determining the direction from which the radiation is originating.

9 Claims, 21 Drawing Figures

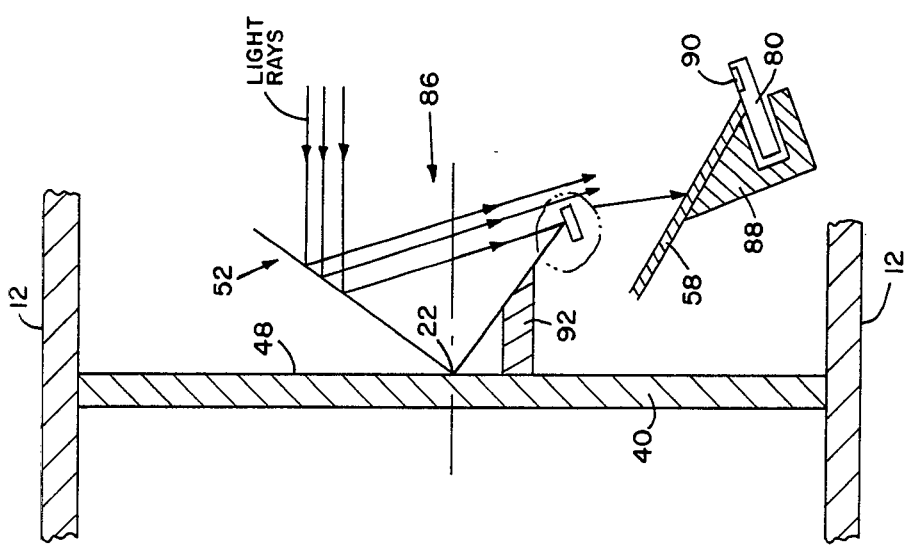
FIG. 7
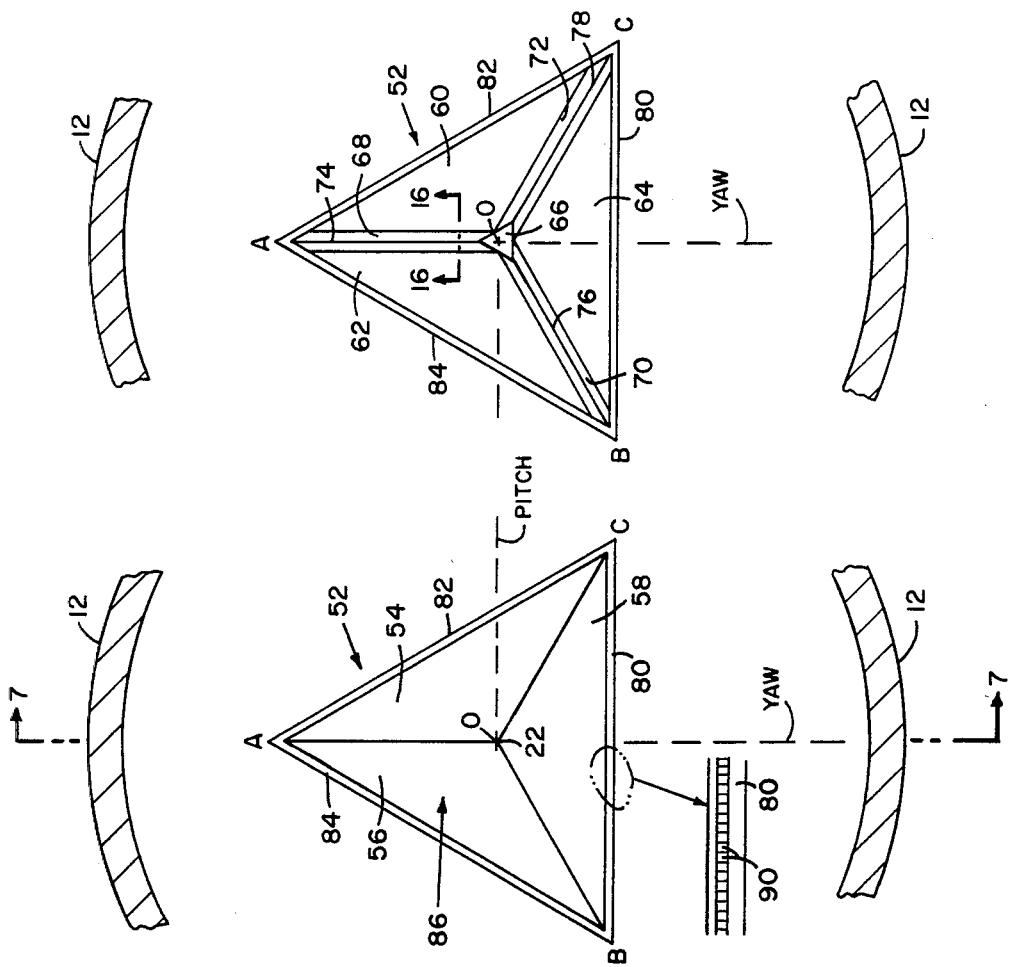
FIG. 6
FIG. 5

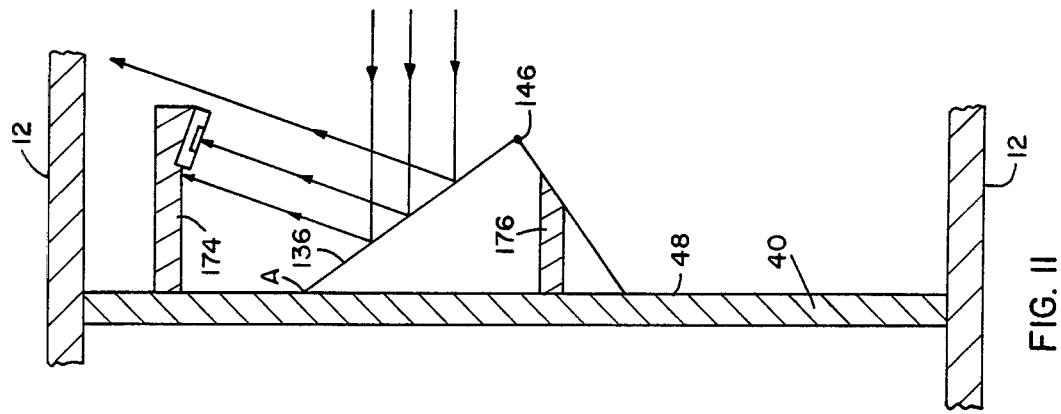
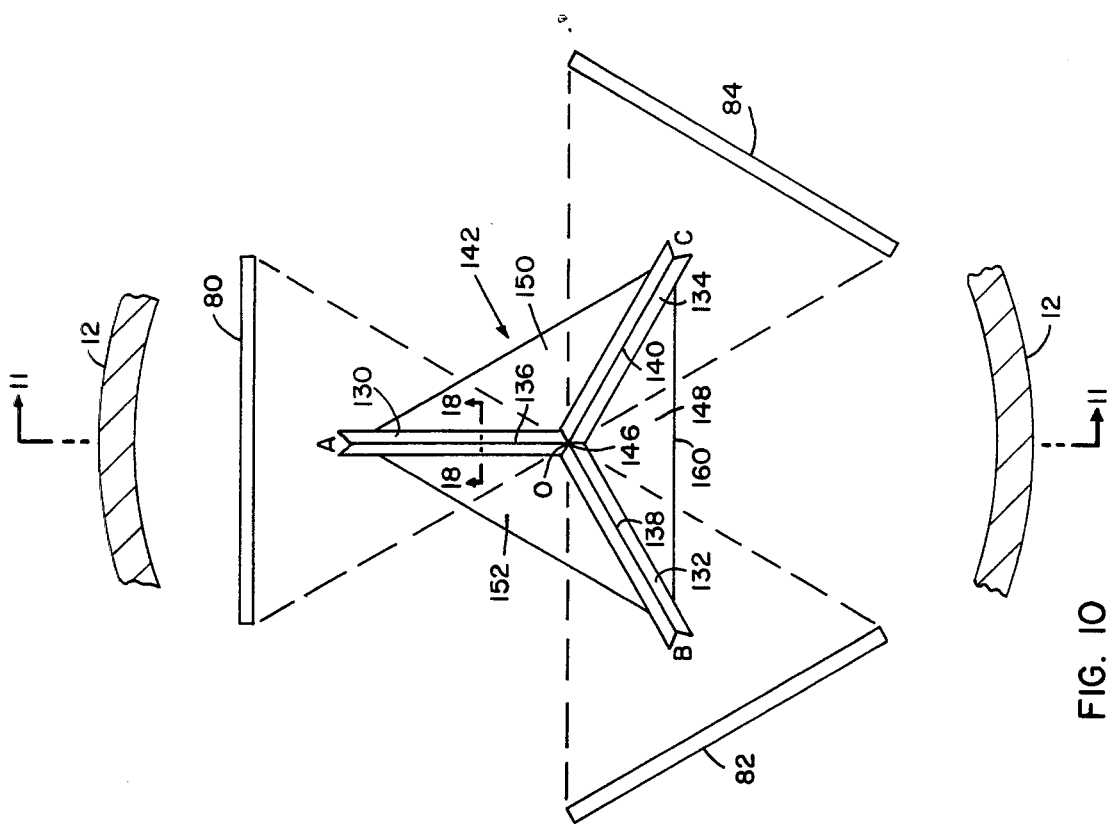
FIG. 11
FIG. 10

NON-RETRO ANGLE OF ARRIVAL METER

DEDICATORY CLAUSE

The invention described herein may be manufactured, used, and licensed by or for the Government for governmental purposes without the payment to us of any royalties thereon.

CROSS REFERENCE TO RELATED APPLICATION

This application is related to copending application Ser. No. 349,128 filed Feb. 16, 1982 by Herbert B. Holl in that this invention relates to improvement in the area of eliminating retro reflection. This invention employs the basic principles and analytical techniques of the earlier invention.

BACKGROUND OF THE INVENTION

In the past, angle of arrival meters have not had the capability of eliminating retro reflection which would enable one at the source to be able to determine that his signal was being looked at. Therefore, this invention is provided for the purpose of detecting the relative angular location of a radiation source within the field of view of the device without retro reflection of received radiation. The present invention eliminates a sometimes-objectable characteristic of the earlier invention, that of retro reflection. In certain applications such as military applications, it is not permissible to present such a retro reflection.

An important characteristic of this invention is that it does not focus, or gather and concentrate incident radiation. For this reason, this invention is useful mainly for strong sources of direct radiation, and will not have sufficient sensitivity to detect very weak sources, such as from diffuse reflectors, scatterers, etc. At the same time, this can be an advantage when the source radiation can be very strong, as from the sun, such that a focusing system's detectors would be damaged. The dynamic range of this invention is the same as for focused systems, but is much lower on an absolute scale. The present invention is such that the essential elements of the reflection mirrors can be presented in several varied configurations so that each will eliminate retro reflection as desired.

SUMMARY OF THE INVENTION

In accordance with this invention, a non-retro angle of arrival meter is provided in which radiation is reflected by two or more mirror reflector means to two or more detectors that produce signals that can be processed to determine the angle from which the radiation is coming. This information can be used to locate the source of the radiation.

BRIEF DESCRIPTION OF THE DRAWINGS

FIG. 5 is a pictorial view of a corner reflector of applicants' configuration A with the apex away from the observer and showing the back side of the three detector arrays position on the edges of the corners' faces and with portions of the housing cut-away;

FIG. 6 is a pictorial view of the truncated corner reflector with the apex away from the observer and showing a tripod of three mutually perpendicular dihedral mirrors as the reflectors and with a portion of the housing cut-away;

FIG. 7 is a view along line 7—7 of FIG. 5 and additionally illustrating schematically the reflection of light rays from one of the dihedral mirrors to a detector array;

FIG. 10 is a pictorial view of the pyramid ABCO with the base ABC away from the observer and illustrating the position of three dihedral mirrors on the pyramid and the arrangement of three detector arrays;

FIG. 11 is a view along line 11—11 of FIG. 10 and schematically illustrating reflection of rays from one of the dihedral mirrors to a detector array;

DESCRIPTION OF THE PREFERRED EMBODIMENTS

Figure 16:
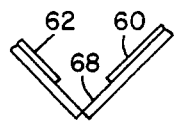
FIG. 16 is a view taken along line 16—16 of FIG. 6.
Figure 18:
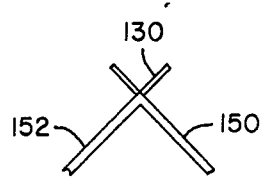
FIG. 18 is a view taken along line 18—18 of FIG. 10.
Figure 20:
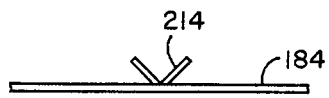
FIG. 20 is a view taken along line 20—20 of FIG. 14.

This invention utilizes the single mirror/detector unit, whose function is to determine the location of the source in one dimension. Two or more such units may be combined to allow locating the source in two angular dimensions. The mirror portion can consist of a flat mirror with a scribed line, or of a dihedral mirror. The dihedral mirror consists of two flat mirrors intersecting at a 90-degree angle such as illustrated in FIGS. 16, 18 and 20.

In either case, the mirror intercepts the source radiation, reflects it to a line-array of detectors, which are employed to determine the position of a reflected dark line. The electronic processor combines the information from any two such detector arrays to calculate the two angles defining the relative location of the source, with respect to the device.

In essence, each mirror/detector unit determines the position of a plane which is defined by the source (a distant point), and the line consisting of the dihedral junction or the scribed line. This plane also contains the reflected image of the dark line, and the detector array is used to determine its position in relation to the assembly.

The device is so arranged that two such planes intersect in a line which contains the source. Therefore, it is evident a priori that locating the dark lines is analogous to locating the source.

Furthermore, it can be shown that, for a source located a long distance away, very little error in angular accuracy of the device is incurred by placing the mirror/detector units some distance from each other, and with arbitrary lateral positioning. Thus many configurations are possible, of which a few are described herein.

This invention includes five configurations, designated Configuration A, B, C, D, and E. These devices utilize various arrangements of their radiation receiving components, e.g., three combinations, each with three dihedral mirrors (Configuration A, C, and E), and two combinations each with three flat-strip mirrors (Configuration B and D). In all these combinations the length of the three dihedral mirrors axes, and the lengths of the three flat-striped mirrors, are made to be equal. In all cases, the three mirror axes are coincident with the legs of a tripod which are mutually perpendicular. This results in an entrance aperture which is an equilateral triangle, with an apex of each construct in the origin of the tripod. Consequently, a hypothetical corner cube is defined, which has no faces of active material, which nevertheless permits the application of the geometrical theory of the corner cube reflector.

The five configurations are grouped as follows:

Two concave or corner type mounts (mirrors face the inside of the tripod)

Configuration A: Three dihedral mirrors—central corner

Configuration B: Three flat-strip mirrors—first hyper corner

Three convex or pyramid type mounts (mirrors face from the outside of the tripod)

Configuration C: Three dihedral mirrors—central pyramid

Configuration D: Three flat-strip mirrors—first hyper pyramid

Configuration E: Three dihedral mirrors—first hyper pyramid

The devices operate when a bundle of parallel light rays illuminates the entire aperture of that hypothetical corner. They differ from the previously filed invention in that these devices are specifically designed to have no retro-reflection. If retro-reflection is desired a small triangular corner cube reflector can be mounted to the apex of the constructs of Configuration A and B. The usefulness of the invention can be divided into two areas of application: Case A, where it determines the location of a remote radiation source (i.e., angle of arrival meter), and case B, where the spatial orientation of a moving object is to be determined, (i.e., guidance system applications).

Case A. The position of the device has to be known, or can serve as the reference. When the plane of the aperture is vertical, the horizontal and vertical aspect angles of the laser source can be determined, with this data a rangefinder can be employed, to measure the distance to the source. It will serve the following purposes:

(a) Position finding (Distance, horizontal and vertical aspect angles).

(b) Warning system. With the position information of (a), the following actions may occur:

(1) evasion,
 (2) screen the threatened position with smoke in the line-of-sight,
 (3) start counter measures such as gunfire, to disable or destroy the illumination source.

Case B.

For determining the attitude of a moving object the received beam, and its length, will be the reference. The sensor will be mounted on an object, exposed to the beam. Then the attitude of the sensor relative to the beam can be measured, and the data can be processed by ground equipment or by appropriate processing components on board the object. Corrections of the object's position can be initiated if necessary. When we can illuminate the object for a certain length of time with a beam, the position of the object can be determined with respect to its direction of movement. If the object is a missile, and rotation is involved, the technique is still applicable, and the rate of rotation can be determined. When the exhaust gases of the missile cannot be penetrated by the beam, three sensor devices may be necessary on board the missile. They should be placed 120° apart, as far away as possible from the missile axis. When the missile rolls, at least one sensor should always be outside the region of the gases. In case B, the invention will serve the following purposes:

(a) Alignment of remote objects.

(b) Communication—position and movement of friendly vehicles and objects, directional message and coded commands.

(c) Controlled landing of airplanes, etc.

(d) Guidance of vehicles, airplanes, etc., moving on the ground, at night, or in adverse weather conditions (fog, smoke).

(e) Devices for the measurement of atmospheric turbulence along certain propagation paths, measuring in both directions simultaneously. Angle of arrival fluctuation meter.

(f) Rescue missions, etc.

It is still a big problem to find a small boat in a rough sea, or persons lost in wilderness and in the mountains, etc. When a helicopter, for example, is equipped with the device under consideration here, and the people in need have a small laser, the rescue action could be made more effective.

Figure 1:
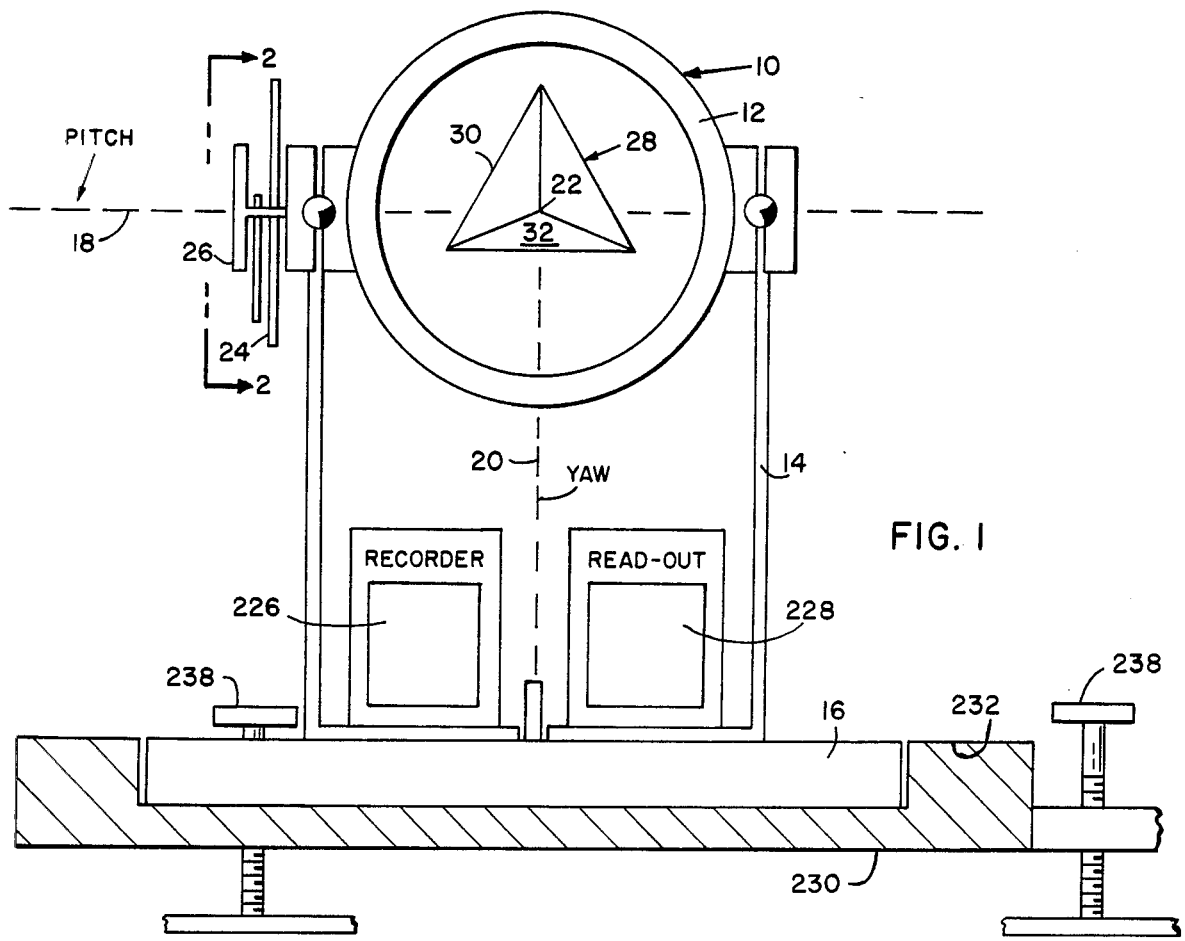
FIG. 1 is a front elevational view, partly in section, of the housing enclosing the angle of arrival meter, and illustrating the aperture of the optical system and showing the U-shape holder and circular platform with support platform.
Figure 2:
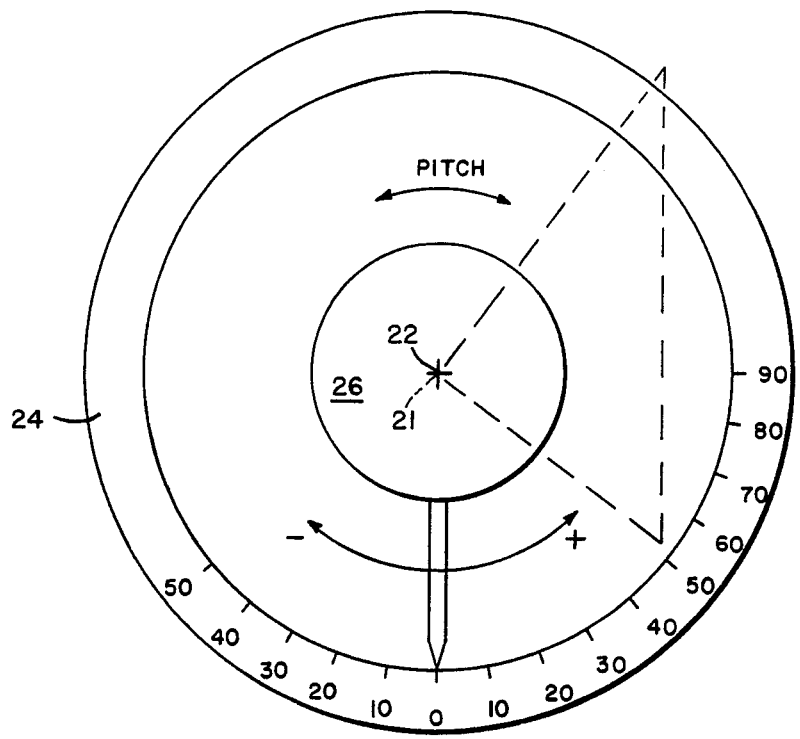
FIG. 2 is an elevational view taken along line 2—2 of FIG. 1 of the angle of arrival meter.

Referring now to the drawing, laser directional sensor 10 includes a housing 12 (FIG. 1) of cylindrical shape, which is mounted through a U-shaped holder 14 on a circular platform 16. This mounting provides rotation in pitch 18 and yaw 20, with the origin in the cylinder axis 21 (FIG. 2). The housing can be tilted in the vertical plane around an axis (pitch) 18 from −45° downward to 90° upward as indicated on scale 24 (FIG. 2). Tilting the housing 12 can be performed by a calibrated hand wheel 26 (FIG. 2) secured to housing 12 in a conventional manner, or with a drive.

For the optical systems employed in the invention, an aperture 28 (FIG. 1) of the form of an equilateral triangle of sides 30 and a centroid 32 are determined, with which and with a point 22 of distance $1/6 \sqrt{6}$ times the aperture side 30 a triangular corner cube is defined, of which point 22 is the apex of the corner.

Inside the circular shaped cylinder 12 (FIG. 3) are the principal parts of the invention. The cylinder 12 is enclosed on the back end by a removable circular base plate 34, and on the front end by a plane parallel plate 36, placed inside a ring 38. A solid support plate 40 is mounted in either of the two positions, illustrated in FIGS. 3 and 4. This plate 40 sub-divides the enclosed space into a front space 42 and a back space 44. In the front space 42 the optical components and the photodetectors 6 are attached to the front side 48 of plate 40 in a conventional manner, the back space houses the electronic processor 50.

The invention includes five examples of many possible arrangements of mirrors and linear detector arrays, and the optical components and photodetectors 46 are described for the configurations A, B, C, D, and E.

Configuration A

The corner 52 (FIG. 5) is a triangular corner cube, built from three mutually perpendicular mirror faces 54, 56, 58. FIG. 5 illustrates the apex 22 away from the observer. In FIG. 6 these three triangular faces 54, 56, 58, are truncated by three similar triangular faces of non-reflecting material 60, 62, 64, and by a small triangular non-reflecting member 66 over the apex 22 of the corner. Member 66 is provided to prevent any retro reflection. The remaining area (reflecting) of the corner cube reflector is a tripod of three dihedral mirrors 68, 70, 72 of opening angle 90°. The dihedral mirror axes 74, 76, 78 are located in the legs of this tripod, e.g., in the lines OA, OB, OC. Three linear detector arrays 80, 82, 84 (FIG. 5) are attached to the sides of the corner's aperture 86. They are mounted in a bracket 88 (FIG. 7) and face the inside of the corner 52 so as not to receive direct radiation. The radiant energy detectors may be slideably or rigidly secured in bracket 88. The radiant energy detectors are sensitive to radiation. These individual detectors 90 are connected to the processor 50 (FIG. 3) in a conventional manner, but not illustrated. The structure illustrated in FIGS. 5 and 6 is fastened to support plate 40 (FIG. 7) by conventional connection means 92 with the corner's apex at 22 on surface 48. In this configuration, the surfaces for dihedral mirrors (FIG. 6) 68, 70, and 72 could be made as separate mirror surfaces than that of total mirror faces 54, 56, 58. That is, only dihedral mirrors 68, 70, 72 need to be mirror surfaces. For example, faces 54, 56, 58 could be non-reflecting material faces with dihedral mirrors 68, 70, 72 placed in the corners.

Configuration B

Figure 9:
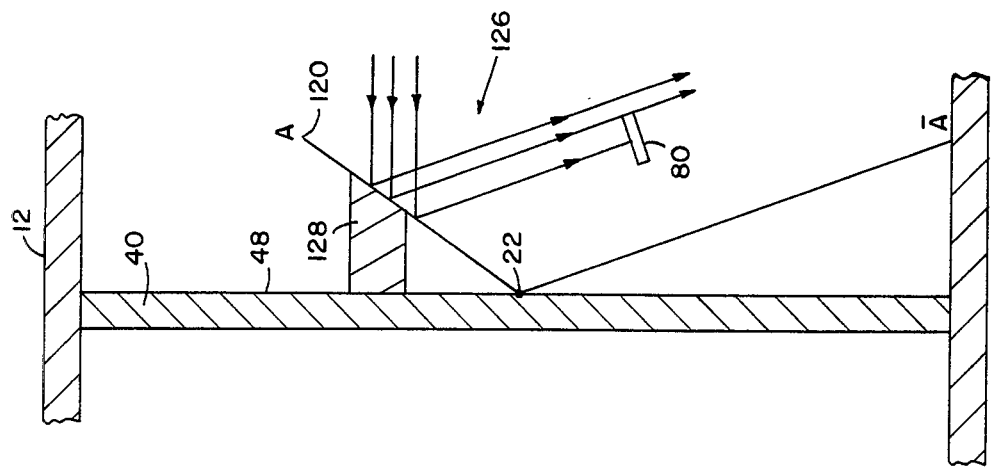
FIG. 9 is a view along line 9—9 of FIG. 8 and schematically illustrating reflection of incoming rays from one of the flat-strip mirrors to a detector array.
Figure 8:
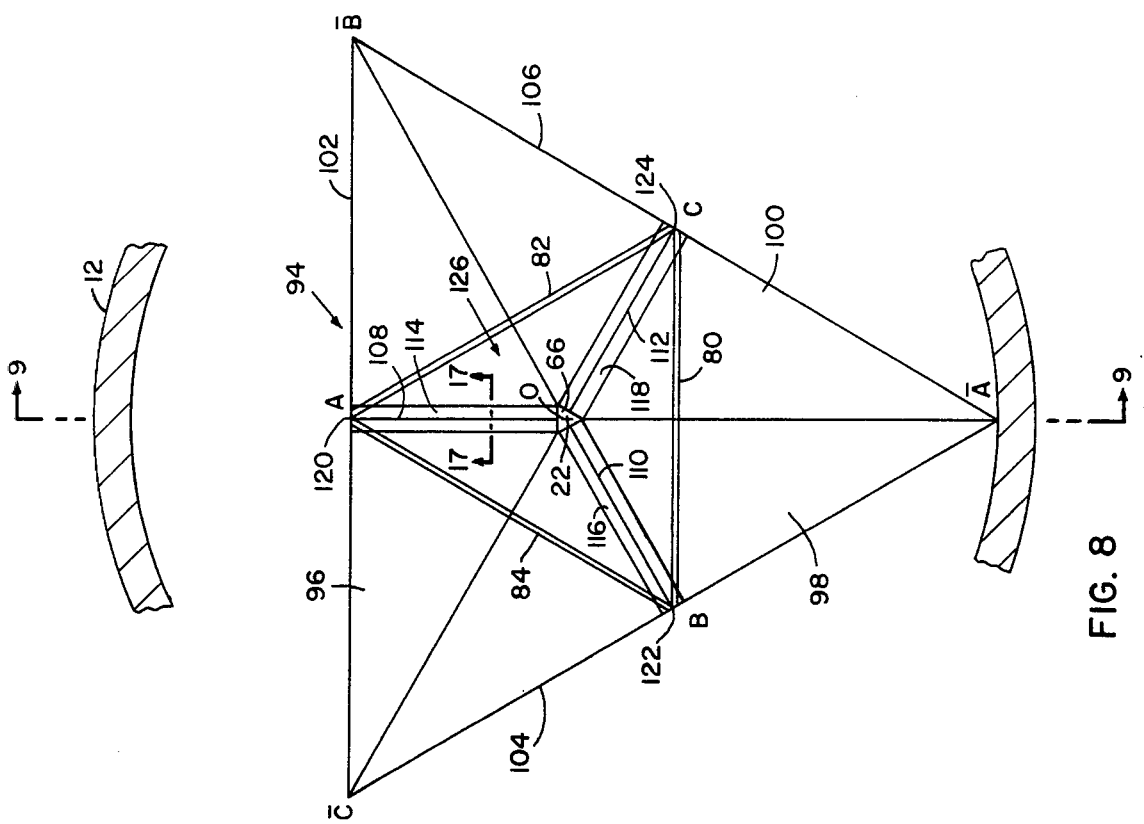
FIG. 8 is a pictoral view of corner $\overline{ABCO}$ which has a side length of twice the side length of corner ABCO and the same perpendicular with the two corners having a common apex away from the observer and showing the location of three flat-strip mirrors and three detector arrays.

The corner 94 (FIG. 8) is a triangular corner, built from three faces 96, 98, 100. FIG. 8 illustrates the apex 22 away from the observer. The three faces 96, 98, 100, made of non-reflecting material, are three congruent isosceles triangles of sides 102, 104, 106, and heights 108, 110, 112, with a base-to-height ratio of $1:\frac{1}{4}\sqrt{2}$. Three flat-strip mirrors 114, 116, 118 are produced by chemical or electroplated metallic deposition, and have a dark line or groove cut along the center, e..g., in the heights 108, 110, 112 of the corner faces. Triangle 66 of non-reflecting material is provided for non-retro reflection at the apex. The end points 120, 122, 124 of these lines or grooves determine the vertices (points A, B, and C) of the entrance aperture 126 of the construct. The construct of FIG. 8 is fastened by conventional connection 128 with the corner's apex 22 at surface 48 of plate 40 (FIG. 9). Three linear detector arrays 80, 82, 84 (FIG. 8), which face to the inside of the corner 94, are mounted to the aperture sides, secured in their end points to the sides 102, 104, 106 of the corner 94 in a conventional manner.

Configuration C

The three dihedral mirrors 130, 132, 134 (FIG. 10) are mounted to the three outside edges 136, 138, 140 of a triangular corner cube (=pyramid 142) whose base is an equilateral triangle. FIG. 10 illustrates the pyramid tip 146 in the paper plane (or as illustrated in FIG. 11) and the base ABC away from the observer. The three pyramid surfaces 148, 150, 152 are made of non-reflecting material. The three line detector arrays 80, 82, 84, are of the same length as the pyramid base side 160, and placed in the paper plane in such a location that each pair of the end points of the detector arrays 80, 82, 84 form with the pyramid tip 146 an equilateral triangle of the same size as the pyramid base ABC as illustrated by the dashed lines (FIG. 10). The linear detector arrays 80, 82, 84, and the pyramid 142 are mounted to surface 48 of the support plate 40 (FIG. 11) by the connections 174 and 176, respectively.

Configuration D

Figure 13:
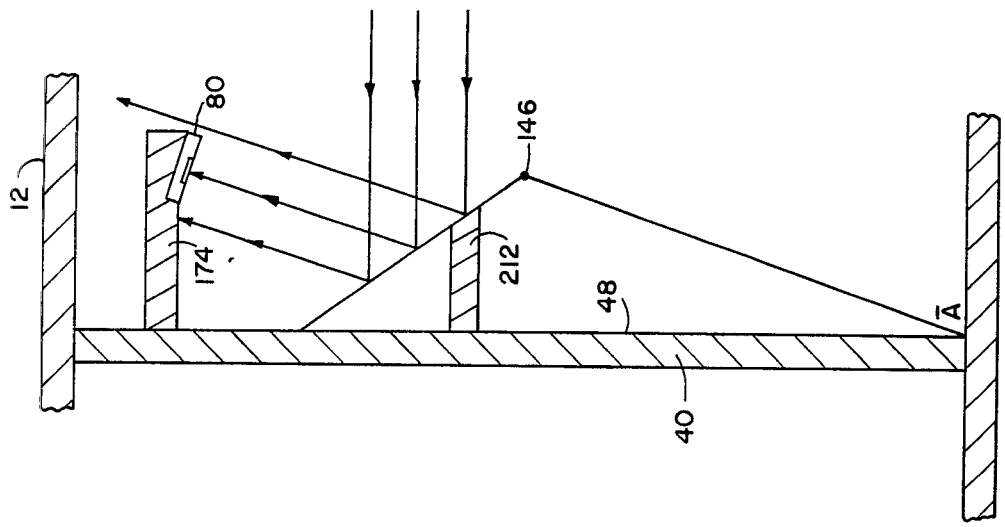
FIG. 13 is a view along line 13—13 of FIG. 12 and schematically illustrating reflection of incoming rays from one of the flat-strip mirrors to a detector array.
Figure 12:
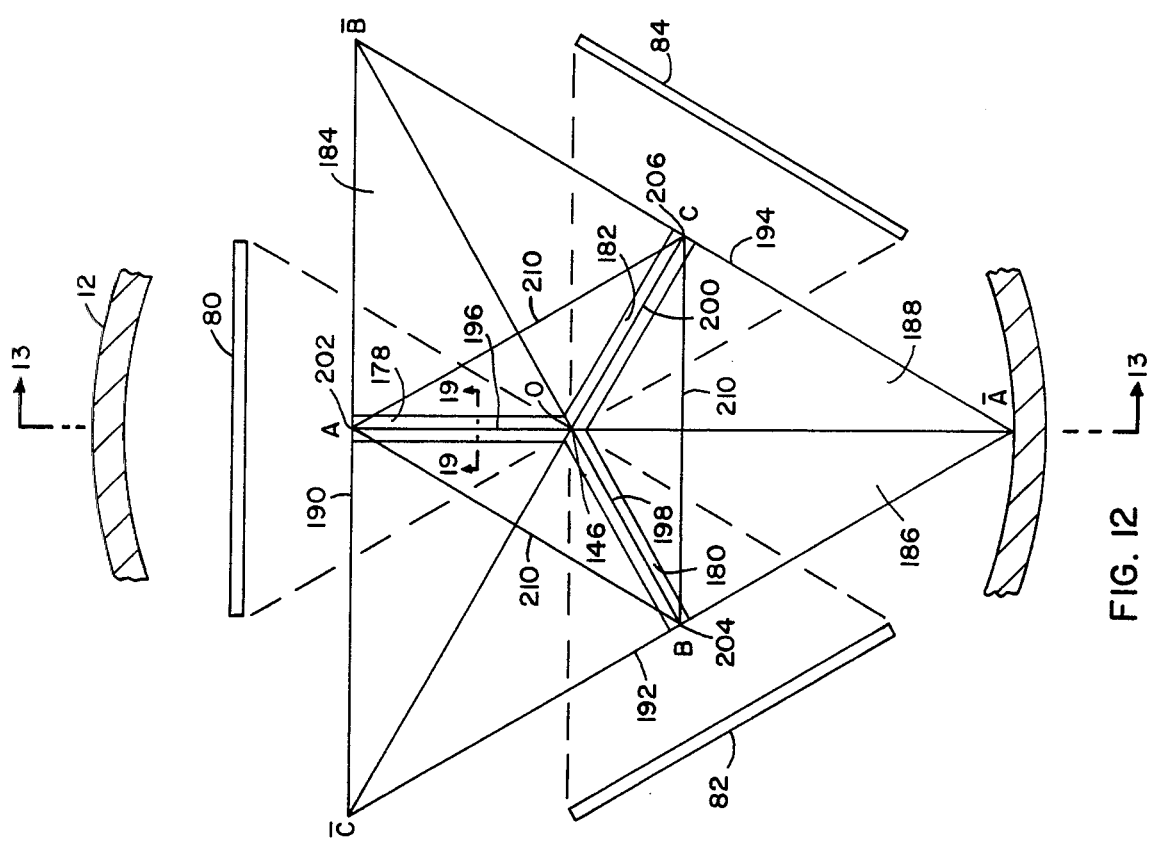
FIG. 12 is a pictorial view of pyramid $\overline{ABCO}$ with the base $\overline{ABC}$ away from the observer and also indicating the position of three flat-strip mirrors and the three detector arrays.
Figure 15:
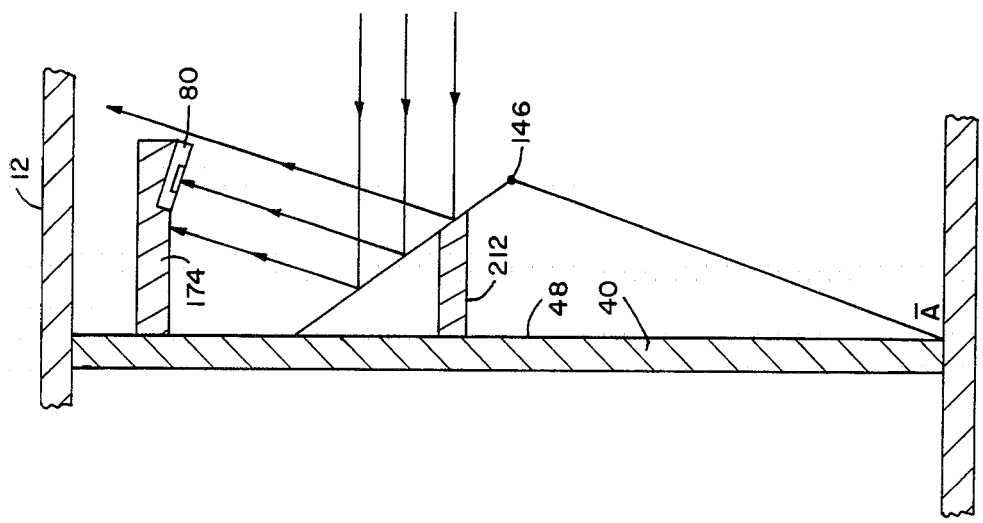
FIG. 15 is a view along line 15—15 of FIG. 14 and schematically illustrating reflection of radiation from one of the dihedral mirrors to one of the detector arrays.

The three flat-strip mirrors 178, 180, 182 (FIG. 12) are mounted to the outside faces 184, 186, 188 of a triangular corner (=pyramid $\overline{ABCO}$) whose base is an equilateral triangle. FIG. 12 illustrates the pyramid tip 146 in the paper plane and the base $\overline{ABC}$ away from the observer. The three pyramid surfaces 184, 186, 188, made of non-reflecting material, are three congruent isosceles triangles of sides 190, 192, 194, and heights 196, 198, 200, with a base side : height ratio of $1:\frac{1}{4}\sqrt{2}$. The three flat-strip mirrors 178, 180, 182 are produced by chemical or electroplated metallic deposition, and have a dark line or groove cut along the center, e.g., in the heights 196, 198, 200 of the pyramid faces. The end points 202, 204, 206 (points A, B, C) of the lines or grooves determine an equilateral triangle ABC of sides 210. The three linear detector arrays 80, 82, 84, are of the same length as the sides 210 of triangle ABC, and are placed in the paper plane in such a location that each pair of the end points of the detector arrays 80 82, 84; form with the pyramid tip 146 or origin O an equilateral triangle of the same size as the triangle ABC a illustrated by dashed lines. The linear detector arrays 80, 82, 84, and the pyramid $\overline{ABCO}$ are mounted to the surface 48 of support plate 40 (FIG. 13) by connections 174 and 212, respectively in a conventional manner.

Configuration E

Figure 14:
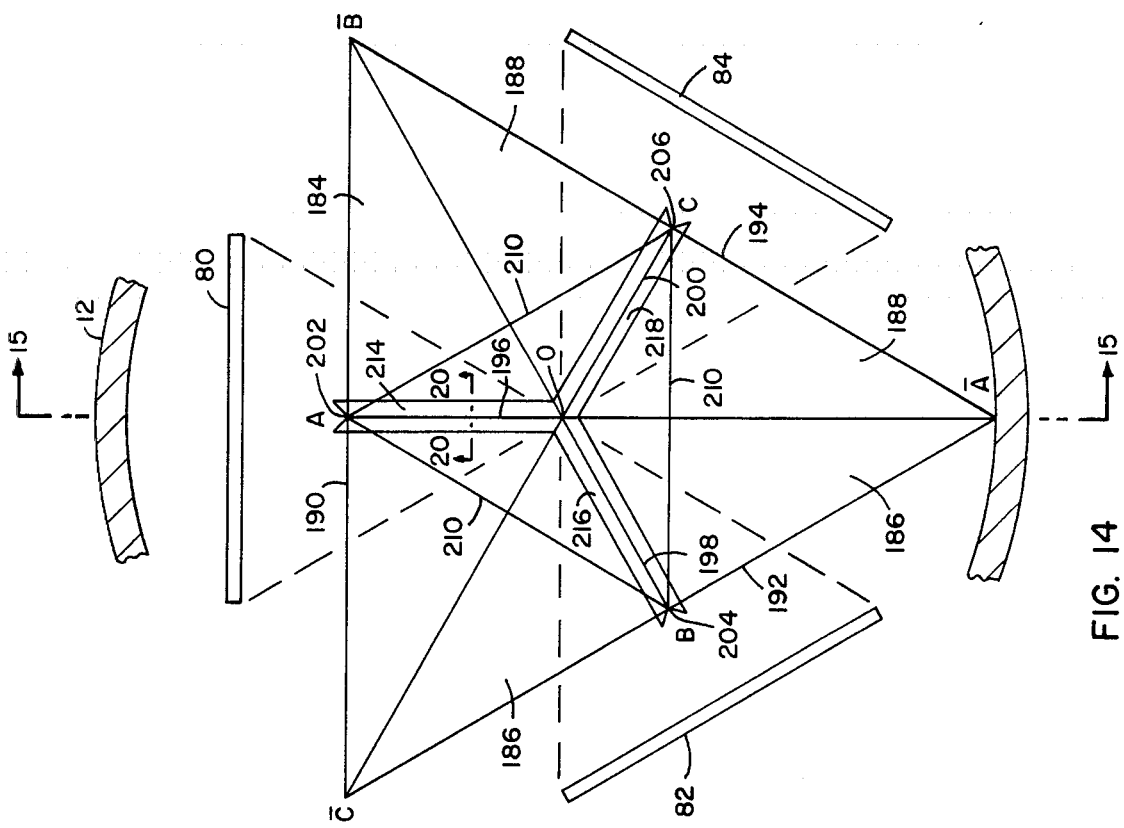
FIG. 14 is a pictorial view of a pyramid $\overline{ABCO}$ with the base $\overline{ABC}$ away from the observer and illustrating the mounting of three dihedral mirrors with their specific detector arrays.

The three dihedral mirrors 214, 216, 218 (FIG. 14) are mounted to the outside faces 184, 186, 188 of the pyramid $\overline{ABCO}$, with the dihedral mirror axes along the heights 196, 198, 200 of the pyramid surfaces 184, 186, 188 in place of the three flat-strip mirrors 178, 180, 182 of configuration D. The other structure of configuration E is the same as configuration D and has been similarly labeled in the drawing.

Figure 3:
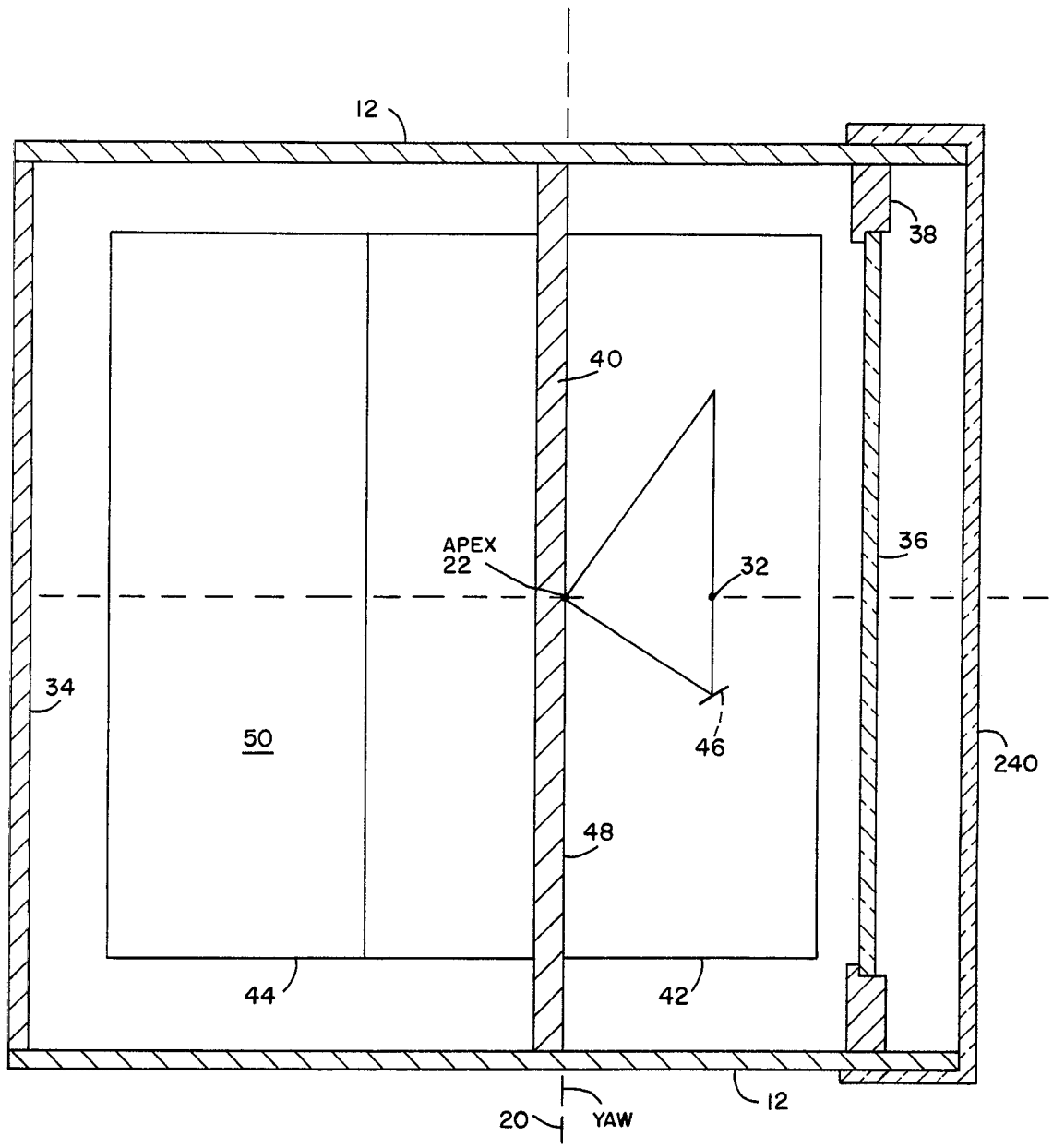
FIG. 3 is a cross-sectional side view of the angle of arrival meter for configurations A and B of this invention and showing the principal components therein.
Figure 4:
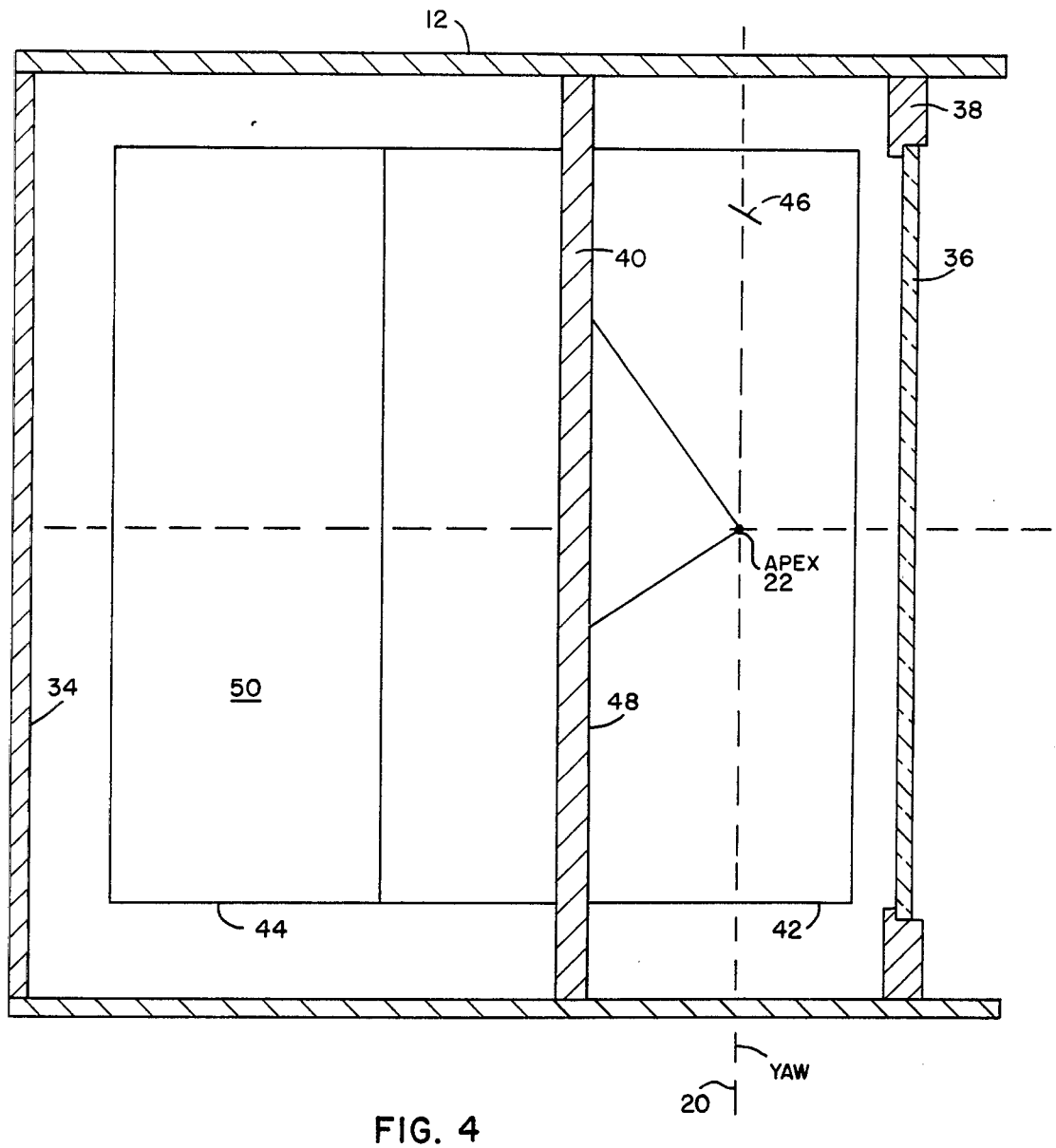
FIG. 4 is a cross-sectional side view of the angle of arrival meter for configurations C, D, and E and showing the principal components therein.
Figure 21:
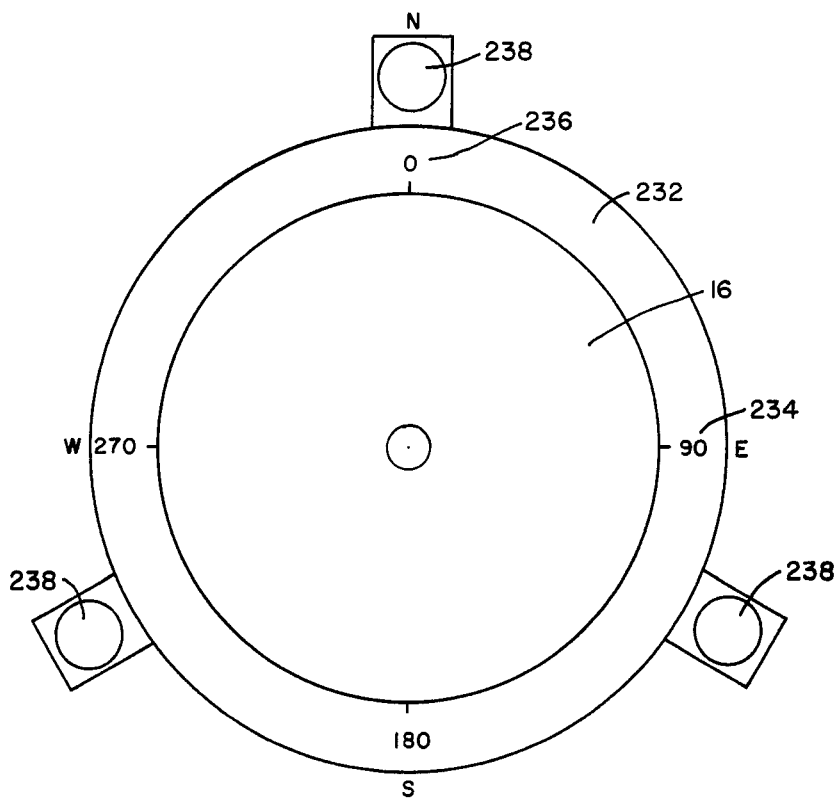
FIG. 21 is a top view of the base which supports the U-shaped holder.

The solid support plate 40 provides proper position of the aforementioned constructs, e.g., the Configurations A through E. With this arrangement (FIG. 1) the devices are well aligned to the axis of rotation 20 (yaw) and 18 (pitch). The detectors 90 of the arrays (FIGS. 5 and 7) are connected in a conventional manner to processor 50 (FIG. 3). From electronic processor 50, the measured data of the detectors is transmitted to a recorder 226, (FIG. 1) and a read-out instrument 228, which are placed on platform 16. Platform 16 is located inside a solid metal housing 230, which forms a ring 232 around platform 16. This ring 232 is calibrated by an angular scale 234 (FIG. 21) which goes cw in azimuth from 0° to 360°. The 0° indication 236 is positioned toward north. Housing 16 is properly leveled by three heavy screws 238, placed on the periphery as illustrated.

On the front end of cylindrical housing 12 (FIG. 3) a cover cap 240 protects the device against dust. Additional protection against pollution for the optical components and the photodetectors 46 is given by a plane parallel plate 36 of reasonable thickness, made from radiation transmitting material, which is placed inside ring 38 in front of the optical components and the detectors 46 or arrays 80, 82, 84, thus providing sealing against the outside. This same component can be made as a spectral filter to reject radiation of unwanted wavelengths.

DETAILED DESCRIPTION OF THE MIRROR POSITIONS

Figure 17:
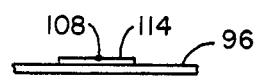
FIG. 17 is a view taken along line 17—17 of FIG. 8.
Figure 19:
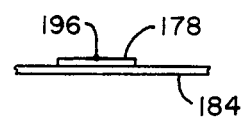
FIG. 19 is a view taken along line 19—19 of FIG. 12.

In the description of the configurations of this invention it has been shown that the three dihedral mirrors or the three flat-striped mirrors are the radiation receiving parts. In Configuration A the three dihedral mirrors (FIG. 6) are formed by the three pairs of small flat mirrors in the intersection of each pair of the three corner surfaces. FIG. 16 illustrates one intersection of a pair of the corner surfaces. The corner is built of three mutually perpendicular faces of 45° right triangles, named triangular corner cube or central mirror. In Configuration B the three dihedral mirrors of Configuration A are replaced by three flat-strip mirrors of small width with a dark center line, which is of same length as the three edges of the central mirror. FIG. 17 illustrates the location of one of these three strip-shaped mirrors relative to its flat support surface rather than in a corner as is the corresponding dihedral mirror which it replaces. These three flat-strip mirrors are geometrically located within the faces of another triangular corner $\overline{ABCO}$ (FIG. 8), which has the same perpendicular as the central corner, but an aperture of side twice the length of that of the central corner $\overline{ABCO}$. The corner ABCO is named here "first hyper central corner". In Configuration C three dihedral mirrors of same lengths as in Configuration A are placed to the outside of the central corner, e.g., to the edges of what we will name "central pyramid". Central pyramid and central mirror have the same base ABC and correspondingly the same lengths for the perpendicular or height. FIG. 18 illustrates the mounting of the dihedral mirror at one of the edges of the control pyramid. In Configuration D the three flat-strip mirrors are in or on the outside faces of the first hyper corner, e.g., in the face heights of what we will name the "first hyper pyramid" and is illustrated by FIG. 19. The first hyper corner and the first hyper pyramid have the same base $\overline{ABC}$, and correspondingly the same lengths for the perpendicular or height. In Configuration E the three dihedral mirrors are placed to the face heights of the first hyper pyramid, which brings the dihedral mirror axes into the same positions as the dark lines in Configuration D and has the structure in section as illustrated in FIG. 20.

CYCLE OF OPERATION

In operation the device is oriented in the direction, from which radiation is expected. The aperture side BC is horizontally oriented and the aperture ABC is vertically oriented. For perfect operation, the aperture of the device has to be entirely illuminated. Then the parallel light rays from the remote radiation source propagate through the front window and through the aperture ABC of the device to the three mirrors (dihedral or flat-strip mirrors). Depending on the initial direction, from where the radiation comes, rays will experience in the case of three dihedral mirrors (Configurations A, C, and E) either two or one and two reflections, and in the case of the flat-strip mirrors (Configurations B and D) one reflection with the mirrors.

The mirrors produce three or two light bundles of rectangular shape, which have in general different sizes. Each reflected light bundle has a dark line or dark region in the center. When these bundles of light on their way out of the construct pass through the plane of aperture, e.g., inside or outside the entrance aperture ABC, the rays in the base side of the rectangles will be intercepted by the detectors. These detectors 80, 82, 84 are mounted in Configurations A and B in each side of the three aperture sides, and in Configurations C, D, and E outside the entrance aperture. From the activated detectors, the position of the foot prints of the dark lines, which cause a discontinuity in the output of the detectors, can be determined. The geometrical location of these dark lines along the length of the detector arrays is forwarded to a small computer in the processor 50 inside the housing, which processes the data and finally determines the data of the horizontal and vertical aspect angles. At the end of each cycle these data are submitted to recorder 226 and to read-out instrument 228 outside the device.

The five devices are insensible to hotspots in the radiation. Any electromagnetic radiation, which stems from a primary or secondary source, can be utilized, if the sensor is equipped with appropriate detectors. Detectors are available from UV, Visible, IR to the mm-wavelength region, e.g., photo voltaic cells, thermistors, silicon CCD (charge couple devices), CID (charge injection devices), pyroelectric detectors, metal-oxide-metal diodes, and semiconductor diodes and others. With the semiconductor diodes, the angle of arrival meter may be used up to 4 mm-wavelength, at which wavelength the device would perform the receive function of directional antennas, such as monopulse antennas. Because of the high efficiency of the semiconductor diodes, an improvement of one order of magnitude can be expected. A further option is to use an array of optical fibers as entrance elements for the radiation which direct the radiation to the individual detectors. The angular range of angles the ray makes in the apex of the construct with the perpendicular in the centroid of the entrance aperture is asymmetrical because of the triangular shape of the aperture. For this reason the opening angle of the five devices is within the interval from 78.46° to 90°. A maximal symmetrical angular range for all rays which can be processed is for the Configurations C, D, and E in a circular solid cone of 70.52° diameter, where the axis is in the perpendicular, and the cone's apex is in the distance of $1/6 \sqrt{6}$ d of the centroid of the entrance aperture, where d is the length of the aperture sides. For Configurations A and B the detector chips may block a portion of the entrance aperture, and the diameter of the symmetrical cone of rays which can usefully be processed, which defines the range of aspect angles is estimated to approximately 60°.

In special applications, where a smaller angular field coverage is sufficient (e.g., atmospheric turbulence monitoring, communication, etc.), sensor devices can be made, where only portions of the aperture sides are equipped with linear detector arrays, which has no effect on the accuracy of the angle of arrival components, but which will reduce the cost of the sensor devices. It has been found that for all five configurations a circular solid cone of approximately 8°, 14°, 27°, or 45° diameter of field coverage is obtained when the lengths of the detector arrays are correspondingly equal to 1/12, 1/6, ⅓, or ½ of the lengths of the aperture sides, with the detector pixels centered to the center of the aperture's sides.

For the accuracy, with which the horizontal and vertical aspect angles can be determined, a fraction of a degree is estimated. The accuracy depends on the dimensions of the detectors and the mirrors. At present, it is estimated that the size of the sensors employed in the near infrared region can be quite small, for example, on the order of 5 cm for each side of the aperture. There are applications where larger sizes may be needed. In general, the sensor design is not critical as to size.

In the five configurations, three mirrors are employed e.g., three dihedral mirrors in the surfaces of a corner (Configuration A) or mounted at the sides of a pyramid (Configurations C and E), three flat-strip mirrors in the surface of a corner (Configuration B), or in the surface of a pyramid (Configuration D). These mirrors are brought into the right position by the connection of the corners or pyramids to the support plate. All mirror axes of the flatstrip mirrors or the dihedral mirrors make an elevation angle of $\theta_0' = 35.2644°$ with the surface of the support plate (FIGS. 7, 9, 11, and 13). The projections of these mirror axes on the support plate are placed in positions of 120° azimuth intervals. We deduce for all constructs of sensors the options that fabrication can be simplified if each mirror and support is manufactured into one single piece. This right-triangular piece, made from material of appropriate thickness, in which the mirror axes are manufactured into the hypotenuse of that triangle, is directly fastened in 120° azimuth spacing to the support plate. A further option is to combine each mirror with the corresponding support for the linear detector arrays into one single piece. These pieces can be made of moulded plastics or cast metals, which would provide precision fabrication and cost reduction.

It can be shown that the configurations described (3 mirror/detector units joined in an apex and spaced at 120° intervals) are not always required; rather, this configuration is preferred because it is convenient for packaging and because it is more easily analyzed mathematically. What is essential is that two or more mirror/detector units are so positioned that the line of intersection of their sensing planes is established and known, thereby allowing resolution from this information of the needed horizontal and vertical angles indicating the location of the detected source.

For the two concave or corner type mounts (Configuration A and B), each mirror with the corresponding detector array utilizes the aperture area as entrance and aperture area. In the concave or pyramid type mounts (Configurations C, D, and E) each mirror and corresponding detector array have their particular equilateral triangular exit aperture, congruent with the entrance aperture, which it only partially overlaps. Therefore, if in all configurations the mirror and the corresponding linear detector array is manufactured into a single support to the support plate, these pieces can be laterally and linearly displaced into any location on the platform. The horizontal and vertical aspect angles can be measured as long as the three exit apertures do not superpose each other. These almost arbitrary arrangements are permitted since these sensor devices generally employed for remote radiation sources and moderate displacements of the sensor elements can be tolerated, and will have no effect on the accuracy of the measured data.

In the analysis, developed for the determination of the horizontal and vertical aspect angles of the radiation, the experimental data received from the three detector arrays will be transferred to the sides of the entrance aperture of the hypothetical corner cube, and data processing will occur. In all these various arrangements the entrance aperture and the three exit apertures are within the same surface, which is in a distance of $1/6 \sqrt{6}$ times the aperture side "d" away from the support plate. The surface of the support plate is in all cases the reference plane, the horizontal and vertical aspect angles are measured from the normal of this plane.

It is concluded that for the determination of the angle of arrival, where smaller angular field coverage is sufficient, an infinite number of arrangements, consisting of only two sets of mirror and detector array can be made. The forementioned sensor configurations require an azimuth spacing of 120°. The two mirror-detector array sets can be placed in any azimuth direction, as long as the detector arrays do not interfere. Each arrangement will lead to a specific angular range coverage, which can be determined from the data of angle between the projections of the mirror axes, lengths of the mirrors, and detector array lengths.

We claim:

1. A non-retro angle of arrival meter comprising a triangular aperture with three equally spaced mirror reflecting means mounted for receiving radiation through said aperture, detector means including three detector arrays mounted in pre-determined relationship to said three mirror reflecting means to receive reflected energy from said mirror reflecting means, and said mirror reflecting means being such as to present a dark line in said reflection to said detector means to enable said detector means to determine the angle of arrival of the radiation filling said triangular aperture.

2. A non-retro angle of arrival meter as set forth in claim 1, wherein said triangular aperture is defined by a concave corner reflector in which the mirror means are dihedral mirrors mounted along intersecting corners of the triangular aperture, and the remaining surfaces of said triangular aperture being made of non-reflective material.

3. A non-retro angle of arrival meter as set forth in claim 1, wherein said triangular aperture is defined in a concave equilateral corner cube structure and said reflecting means are three equally spaced strip-mirrors with a dark line equally spaced from opposite sides of each strip and along the length of each strip with the strips being mounted along the heights of three triangles of which the triangular aperture is carved out by the mounting of the detector arrays from end to end of the reflective strip mirrors.

4. A non-retro angle of arrival meter as set forth in claim 1, wherein said aperture is defined by a pyramid shaped structure with three equal surfaces of non-reflecting material and said mirror reflecting means being comprised of three dihedral mirrors equally spaced and positioned at edges of the pyramid and meeting at an apex of the pyramid.

5. A non-retro angle of arrival meter as set forth in claim 1, wherein said aperture is defined by an equilateral triangular shape of a portion of a pyramid shaped structure and said pyramid structure having three equal sides and having non-reflecting surfaces, each of said sides having the same height and said mirror reflecting means including strips mounted on said three sides of said pyramid at the height of each side and each strip having a line centered between opposite sides of the strip and along the length of the strip.

6. A non-retro angle of arrival meter as set forth in claim 1, wherein said aperture window is defined by an equilateral triangle shape of a portion of a pyramid shaped structure and said pyramid structure having three equal sides and said sides having non-reflecting surfaces, each of said sides having the same height, and said mirror reflecting means are dihedral mirrors mounted at the height of said three sides which form said pyramid shaped structure and said dihedral mirrors being joined at an apex of said pyramid shaped structure.

7. A non-retro angle of arrival meter as set forth in claim 1, wherein when said aperture is illuminated, said mirror means will reflect to said detector means and said detector means producing signals that are transmitted to processor means that have the ability to process the signals and determine the direction from which the illumination is coming.

8. A non-retro angle of arrival meter as set forth in claim 7, wherein each detector array is mounted perpendicular to the length of one of said mirror means.

9. A non-retro angle of arrival meter as set forth in claim 8, wherein said mirror reflecting means and said detector means are mounted on a common structure that is pivotal in pitch and yaw to properly orient the aperture relative to the radiation desired to be detected.

* * * * *